United States Patent
Capellmann et al.

(10) Patent No.: US 7,470,177 B2
(45) Date of Patent: Dec. 30, 2008

(54) DEVICE FOR CONTROL OF AIR FLOW RATES TO THE INSTRUMENT PANEL AIR OUTLETS OF A VEHICLE HEATING OR AIR CONDITIONING UNIT

(75) Inventors: Christoph Capellmann, Wuerselen (DE); Olaf Degenhardt, Pulheim (DE); Michael Friedl, Pulheim (DE); Christian Heidinger, Bonn (DE); Christoph Malig, Erkelenz (DE); Markus Matthes, Cologne (DE); Dietmar Zehren, Freudenburg (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 128 days.

(21) Appl. No.: 11/540,128

(22) Filed: Sep. 29, 2006

(65) Prior Publication Data
US 2007/0077878 A1    Apr. 5, 2007

(30) Foreign Application Priority Data
Oct. 1, 2005    (DE)    ............ 10 2005 047 253

(51) Int. Cl.
  *B60H 1/34*    (2006.01)
  *B60H 1/24*    (2006.01)
  *B60H 1/00*    (2006.01)
(52) U.S. Cl. ............ 454/145; 454/69; 454/143; 165/204
(58) Field of Classification Search ............ 454/99, 454/143, 152, 155, 69, 145; 165/204
See application file for complete search history.

(56) References Cited
U.S. PATENT DOCUMENTS

| | | | | |
|---|---|---|---|---|
| 3,635,245 A | * | 1/1972 | Canfield | ............ 137/607 |
| 4,747,942 A | * | 5/1988 | Strauss | ............ 209/455 |
| 5,106,018 A | * | 4/1992 | Loup | ............ 237/12.3 B |
| 5,137,491 A | * | 8/1992 | Ishihara et al. | ............ 454/152 |
| 5,462,483 A | * | 10/1995 | Loup | ............ 454/160 |
| 5,476,418 A | * | 12/1995 | Loup | ............ 454/121 |

(Continued)

FOREIGN PATENT DOCUMENTS

DE    197 57 280 A1    12/1997

(Continued)

*Primary Examiner*—Steven B McAllister
*Assistant Examiner*—Patrick F. O'Reilly, III
(74) *Attorney, Agent, or Firm*—Fraser Clemens Martin & Miller LLC; J. Douglas Miller

(57) ABSTRACT

A device for control of the air flow rates into the instrument panel air outlets of a vehicle heating or air conditioning unit is described that is provided with a casing, with damper doors for both instrument panel side air outlets in the casing parts and at least one damper door for the instrument panel central air outlet in the casing part, whereby the damper doors are pivotably supported on one common shaft. Exactly one closing position is assigned to the damper doors in the first casing part, whereas several closing positions are assigned to the damper door in the second casing part continuously over a pivoting range of the shaft, whereby the closing position of the damper doors is arranged in the pivoting range of the damper door. This device enables separation and independent control of the air flow rates.

20 Claims, 1 Drawing Sheet

U.S. PATENT DOCUMENTS 6,463,998 B1 * 10/2002 Shindo .................. 165/204
2004/0219874 A1 * 11/2004 Karadia .................. 454/155

FOREIGN PATENT DOCUMENTS

| DE | 100 48 529 | A1 | 9/2000 |
| DE | 101 35 330 | A1 | 7/2001 |
| EP | 1 407 903 | A1 | 10/2002 |

* cited by examiner

DEVICE FOR CONTROL OF AIR FLOW RATES TO THE INSTRUMENT PANEL AIR OUTLETS OF A VEHICLE HEATING OR AIR CONDITIONING UNIT

CROSS-REFERENCE TO RELATED APPLICATION

This application claims priority to German Patent Application Serial Number 102005047253.2-16, filed Oct. 1, 2005, the entire disclosure of which is hereby incorporated herein by reference.

FIELD OF THE INVENTION

The invention relates to a device for the control of the air flow rates into the instrument panel air outlets of a vehicle heating or air conditioning unit that achieves improvement of the separation and control of the air flow.

BACKGROUND OF THE INVENTION

In many configurations of air conditioning units, the air flow rates into the side outlets of the instrument panel are defined for the window ventilation mode, the floor/window intermediate mode and the floor ventilation mode. This air is used to prevent the side windows from fogging or icing up and to deliver some warm air between the cold window and the passengers in order to enhance the temperature comfort. In most cases, the air conditioning unit is equipped with one or several damper doors at the openings for the side regions and the central region of the instrument panel. Thereby, the flow path to the central region of the instrument panel must be configured closable by use of the appropriate damper door while the flow path to the side openings of the instrument panel keeps opened. Frequently, the outlet of air into the side regions of the instrument panel is ensured by that at the instrument panel side outlet damper doors, there are holes and/or regions that cannot be closed at all. It is disadvantageous of these designs that, with the exception that the hole sizes at the outlet damper doors are dimensionable, they do not allow the air flow rate into the side regions of the instrument panel to be controlled. The air flow rate can only be tuned for one ventilation mode, for example, the floor mode. For other modes such as the window mode or the floor/window intermediate mode, there is no possibility at all to adapt the air flow rate exiting through the side openings of the instrument panel.

Devices for control of several different air flow rates are disclosed in the following documents.

In DE 100 48 529 A1, the different air flow rates are set by means of at least two damper doors mounted on a shaft. By rotating only one shaft, the damper doors mounted on said shaft can be moved. The single damper doors include means for adjustable, opposite-sense setting of several air flow rates to different air guiding channels. As an advantageous embodiment, it is recommended that the at least two damper doors mounted on the shaft should be oriented at an angle of 60° to each other. In this way, by simple means, the possibility is raised to provide several air guiding channels with the desired air flow rates using one single mechanical component. A disadvantage of this embodiment is that no independent control of the air flow rates through one or several damper doors is possible when one of these damper doors is closed.

In DE 101 35 330 A1, a drive mechanism for damper doors is described that serve to control the flow through air guiding channels of a vehicle heating or air conditioning unit. Several damper doors, preferably three, are operated by means of a common drive. One of the damper doors is only moved over part of the opening or closing motion of the other damper doors but held in a closing position for the remaining part of the pivoting motion. A common drive is provided with at least one gear wheel which engages with segment gears of both damper doors, whereby a segment gear the next to last tooth of which is omitted is assigned to one of the damper doors so that the toothing can get out of gear. At the same time, a lever connected with the segment gear engages with the gate ensuring continued holding of the damper door in the closing position. An offset pair of teeth located outside the toothing plane ensures defined re-engagement of the separated gears. The advantage of such a design is that it enables to move different damper doors on one shaft and hold, however some of them in the closing position independent of the other ones. Disadvantageous are the material and cost efforts for such an expensive realization.

It is the objective of the present invention to establish an instrument panel damper door device in the casing of a vehicle heating or air conditioning unit while maintaining the advantages of the art, such that separation and independent control of the air flow rates is achieved with means that are plain in design.

SUMMARY OF THE INVENTION

Consistent and consonant with the present invention, an instrument panel damper door device in the casing of a vehicle heating or air conditioning unit wherein separation and independent control of the air flow rates is achieved with means that are plain in design, has surprisingly been discovered.

In one embodiment of the invention, an instrument panel damper door device for control of air flow rates into instrument panel air outlets of a vehicle heating and air conditioning unit comprises: a casing with a first damper door for a first instrument panel air outlet in a first casing part and a second damper door for an instrument panel central air outlet in a second casing part, whereby the first damper door and the second damper door are pivotably supported on a common shaft, wherein one closing position is assigned to the first damper door and a plurality of closing positions are assigned to the second damper door over a pivoting range of the shaft, and wherein the closing position of the first damper door is arranged in the pivoting range of the shaft.

The problem of the invention is solved by the features described above.

The device for the control of the air flow rates into the instrument panel outlets of a vehicle heating or air conditioning unit comprises a casing with damper doors for both instrument panel side outlets and at least one damper door for the instrument panel central outlet. All damper doors are pivotably supported on a common shaft, that is, they can be moved simultaneously by rotating said shaft, which is preferably positioned central between the damper door wings. One closing position is assigned to the side damper doors over a defined pivoting range of the shaft. Several closing positions, however, are assigned to the central damper door, that is the closing position is continuously maintained over the defined pivoting range of the shaft. The one closing position of the side damper doors is established within the pivoting range of the common shaft wherein the central damper door remains closed. Preferably, the pivoting range of the shaft is configured to extend over an angle from 0° to 38°.

Concerning the shape of its inner walls, the casing part in the region of the side damper doors differs from the casing part in the region of the central damper door. Thus at least one inner wall of the casing part, for example the lower one, is configured as a planar surface parallel to the outer edge of the damper door in the pivoting range of a side damper door.

On the other hand, in the pivoting range of the central damper door, the casing part along the lower inner wall is preferably configured as a concave cylinder element. Preferably, the single damper doors are configured as pairs of damper door wings positioned opposite to each other on the shaft. In another advantageous embodiment of the invention, the damper doors on the common shaft are oriented in phase, at an angle of 0° to each other.

Preferably, in the casing part that comprises the pivoting range of the side damper doors, the upper and lower inner walls are planar surfaces parallel to each other.

In the central casing part, the pivoting range of the central damper door, preferably two concave cylinder segments oppose each other, whereby one segment is established on the upper inner wall and the other segment is established on the lower inner wall. The concave cylinder segments can be formed by projections on the inner walls. In a preferred embodiment, the cylinder segment on the upper inner wall is formed by two nose-like projections, while in another embodiment the cylinder segment located opposite starts at the lower edge of the lower inner wall and is then formed by only one nose-like projection.

In an alternative embodiment the cylinder segments opposite to each other are not formed by projections on the casing wall but by a recess in form of a cylindrical widening of the casing.

The common shaft preferably extends longitudinally axially through the entire casing of the device. Preferably, three damper doors in all are moved at the common shaft, whereby, preferably again, two damper doors are provided for both instrument panel side air outlets and one damper door is provided for the instrument panel central air outlet.

The invention enables one to adjust the instrument panel damper doors by means of the common shaft such that the air exits to the instrument panel sides, while the central outlet remains closed. The central outlet remains closed, because the outer edges of the central outlet damper door bear against the inner walls of the casing still sealing. Both side damper doors, however, do not bear against the inner walls of the casing. On the contrary, they form open cross-sections between the outer longitudinal edges of the damper door and the inner casing walls with the area of the open cross-sections dependent on the damper door angle positions.

Preferably in the region of the instrument panel central outlet damper door, at the upper and lower inner casing walls, the casing has two concave-bent surfaces opposite to each other that together form a circular cylinder segment, whereby both damper door wings take up the radius of the circular cylinder segment. Hence the central opening damper door moves into the circular cylinder segment in such a way that no open cross-section for an air flow outlet from the central opening of the instrument panel is available, because the longitudinal edges of the damper door wings bear against the wall of the circular cylinder segment in sealing manner.

At the side openings of the instrument panel, however, the casing is not configured cylindrical but preferably, has planar inner surfaces opposite to each other running parallel. When the damper doors are open, the air can flow through the channel to the side of the instrument panel. Thus the air flow rate can be controlled by the damper door angle position using the shaft. The cylindrical-shaped segment in the casing region of the central instrument panel preferably should cover a pivoting range from 0° to 38°, wherein the damper door bears against the cylindrical part of the inner wall of the casing sealing with its outer edges, hence holding the instrument panel central air outlet closed yet.

The invention allows for the instrument panel central outlet closed to independently control the air flow rates to the instrument panel sides by setting the damper door angles. So the different settings of the air flow to the instrument panel sides for the window mode, the floor/window intermediate mode and the floor mode are achievable.

DESCRIPTION OF THE DRAWINGS

Further details, features and advantages of the invention will become apparent from the detailed description of examples of embodiment with reference to the accompanying drawings. It is shown by FIG. 1a the sectional side view of a casing part of the device according to the invention with a side damper door.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1B:
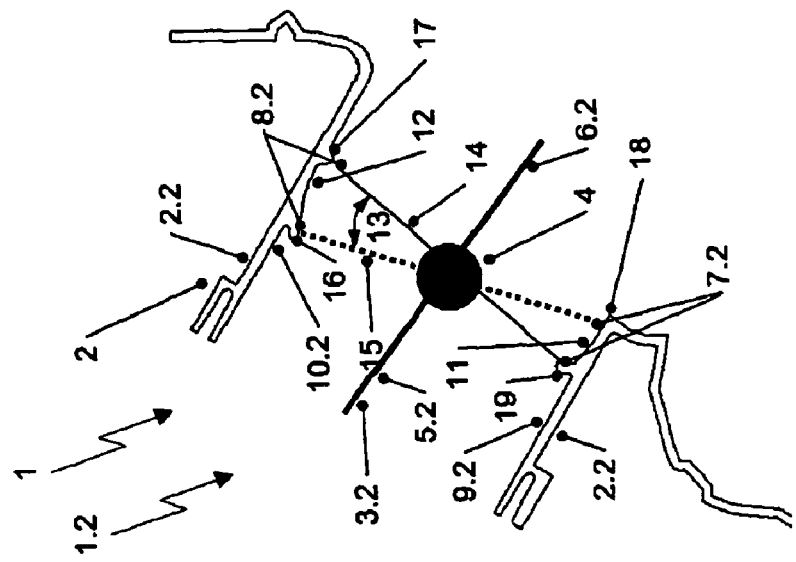
FIG. 1b the sectional side view of the central casing part of the device according to the invention with the central damper door.
Figure 1A:
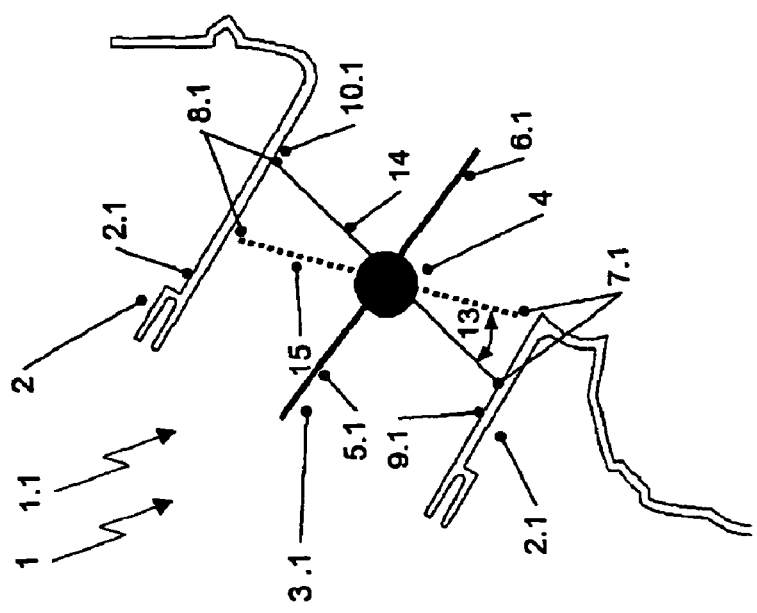

The device 1 has two instrument panel side air outlets 1.1 to FIG. 1a and an instrument panel central air outlet 1.2 to FIG. 1b. The outlets 1.1, 1.2 are substantially aligned in a common plane.

The device 1 for the control of the air flow rates into the instrument panel air outlets of a vehicle heating or air conditioning unit comprises, at its instrument panel side air outlets 1.1 to FIG. 1a, the part 2.1 of the casing 2 with a damper door 3.1 each for either instrument panel side air outlet 1.1. Both damper doors 3.1 are pivotably supported on a common central shaft 4 which extends longitudinally axially through the entire casing 2. The shaft 4 is preferably placed approximately in the centre of the casing part 2.1. On both sides of the shaft 4, the shaft 4 is provided with damper door wings 5.1 and 6.1 which have outer longitudinal edges 7.1 and 8.1, forming what is known in the art as a butterfly damper door.

In the device 1 of the invention the casing part 2.1 has planar inner surfaces in the pivoting region of the damper doors 3.1. Preferably, in the pivoting region of the damper door 3.1, the part 2.1 of the casing 2 is configured such that the lower inner wall 9.1 and the upper inner wall 10.1 are parallel planar surfaces in three-dimensional space. The upper inner wall 10.1 is wider than the lower inner wall 9.1, therefore projecting in direction of the passenger compartment longer than the lower inner wall 9.1. The continuous line in FIG. 1a defines a damper door angle position 14 of the damper door 3.1 which is also the closing position as in this position 14 the outer longitudinal edges 7.1, 8.1 bear against the inner walls 9.1, 10.1 in sealing manner. Being pivoted within the pivoting range 13 the damper door 3.1 can move into position 15 which is identified by the dotted line. To FIG. 1a, position 15 shows the side damper doors 3.1 in an open position. In this case, in position 15, the outer longitudinal edges 7.1, 8.1 of the side damper doors 3.1 do not bear against the inner walls 9.1, 10.1.

FIG. 1a indicated that the position 14 is the only possible closing position of the side damper doors within the pivoting range 13.

According to the invention, the device 1 further comprises the casing part 2.2 to FIG. 1b with a damper door 3.2 for the instrument panel central air outlet. The damper door 3.2 is also pivotably supported on the common central shaft 4 which extends longitudinally axially through the entire casing 2, and hence is located between both damper doors 3.1.

According to the invention, the inner walls 9.2 and 10.2 of the casing part 2.2, which are placed opposite to each other, are not configured continuously planar. In side view, to FIG. 1b, part of the lower inner wall 9.2 is configured as concave circular-arc segment 11, and part of the upper inner wall 10.2 is configured as concave circular-arc segment 12. The concave circular-arc segments 11 and 12 located opposite to each other define, together with the surfaces longitudinally adjacent within the casing part 2.2, a shape that can be considered a segment of a circular cylinder.

The circular-arc segments, or cylinder segments 11 and 12 are arranged on the casing inner walls 9.2 and 10.2 in such a way that the damper door wings 5.2 and 6.2 of the damper door 3.2 correspond to the radius of the above-mentioned circular cylinder within the pivoting range 13. Hence the damper door 3.2 with its outer longitudinal edges 7.2 and 8.2 bears against the cylindrical-shaped region of the inner casing wall in sealing manner, whereby this region is formed by the concave cylinder segments 11 and 12 opposite to each other.

So the central damper door 3.2 closes the path of the air flow into the central part of the instrument panel within the pivoting range 13. As the damper door angle positions 14 and 15 to FIG. 1b are inside the pivoting range 13, both positions as well as all positions in between are closing positions.

The function of the device 1 becomes apparent by coherent consideration of FIGS. 1a and 1b.

The side damper doors 3.1 are open in the damper door angle position 15 dotted shown in FIG. 1a. Preferably in phase, that is at the equivalent damper door angle position 15 on the common shaft 4, the instrument panel central damper door 3.2, also dotted in FIG. 1b, within the pivoting range 13 still bears with its outer edges 7.2 and 8.2 against the cylindrical-shaped inner wall of the casing part 2.2 in sealing manner. In contrast to the damper doors 3.1 for the instrument panel side air outlets, the central damper door 3.2 is still at closing position when at position 15 of the dotted line.

In an embodiment of the invention the concave cylinder segments 11 and 12 are formed by projections on the inner walls 9.2 and 10.2.

Preferably, the concave circular-arc segment or the cylinder segment 12 is formed by two nose-like projections 16 and 17 at the upper inner wall 10.2 of the casing. Also in the casing part 2.2, the upper inner wall 10.2 is wider than the lower inner wall 9.2 and therefore is longer than the lower inner wall 9.2 projects in direction of the passenger compartment. The lower circular-arc segment or the cylinder segment 11 preferably starts at the lower edge 18 limiting the lower inner wall 9.2 in direction of the passenger compartment and is then formed by only one nose-like projection 19.

In another advantageous embodiment of the invention the cylindrical-shaped segment which is formed by both opposite concave cylinder segments 11 and 12 in the casing part 2.2 images a pivoting range 13 from 0° to 38°, wherein the central damper door 3.2 with its outer longitudinal edges 7.2 and 8.2 still bears against the cylindrical-shaped inner wall of the casing part 2.2 and hence is at closing position.

Within the pivoting range the air flow rate which is to pass through the instrument panel side outlets is controlled by the size of the open cross-sections between the outer longitudinal edges 7.1, or 8.1, respectively, and the inner walls 9.1, or 10.1 of the casing part 2.1.

In another advantageous embodiment of the device 1 for control of the air flow rates, there are defined damper door angle positions of the damper doors 3.1 for the following ventilation modes:

for the window mode,
for the floor/window intermediate mode, and
for the floor mode.

As all three settings are within the pivoting range, in which the instrument panel central outlet is still closed, this embodiment establishes an independent control of the air flow rates flowing to the instrument panel sides.

From the foregoing description, one ordinarily skilled in the art can easily ascertain the essential characteristics of this invention and, without departing from the spirit and scope thereof, can make various changes and modifications to the invention to adapt it to various usages and conditions.

Nomenclature
1 device
1.1 instrument panel side air outlets
1.2 instrument panel central air outlet
2 casing
2.1 casing part of the damper doors for the instrument panel side air outlets
2.2 casing part of the damper door for the instrument panel central air outlet
3.1 instrument panel side damper doors
3.2 instrument panel central damper door
4 shaft for all damper doors
5.1 damper door wing for side damper door
5.2 damper door wing for central damper door
6.1 damper door wing for side damper door
6.2 damper door wing for central damper door
7.1 lower longitudinal edge of a side damper door 3.1
7.2 lower longitudinal edge of the central damper door 3.2
8.1 upper longitudinal edge of a side damper door 3.1
8.2 upper longitudinal edge of the central damper door 3.2
9.1 lower inner wall of the casing part 2.1
9.2 lower inner wall of the casing part 2.2
10.1 upper inner wall of the casing part 2.1
10.2 upper inner wall of the casing part 2.2
11 cylinder segment
12 cylinder segment
13 pivoting range of the damper doors 3.1 and 3.2 at closing position of 3.2
14 closing position of 3.1
15 open position of damper door 3.1
16 nose-like projection at the upper inner wall 10.2
17 nose-like projection at the upper inner wall 10.2
18 edge at the lower inner wall 9.2
19 nose-like projection at the lower inner wall 9.2

What is claimed is:

1. A device for control of air flow rates into instrument panel air outlets of a vehicle heating and air conditioning unit comprising:

a casing with a first damper door for a first instrument panel air outlet in a first casing part and a second butterfly damper door for an instrument panel central air outlet in a second casing part wherein the first outlet and the second outlet are substantially aligned in a common plane, whereby the first damper door and the second damper door are pivotably supported on a common shaft and oriented on the shaft in phase at an angle of substantially 0° to each other, wherein only one closing position is assigned to the first damper door over a pivoting range of a pivoting region of the shaft, and a plurality of closing positions are assigned to the second damper door over the pivoting range of the shaft, and wherein the closing position of the first damper door is arranged in the pivoting range of the shaft.

2. The device according to claim 1, wherein the pivoting range of the shaft is established over an angle from 0° to 38°.

3. The device according to claim 1, wherein a lower inner wall of the first casing part is a substantially planar surface in the pivoting range of the shaft.

4. The device according to claim 1, wherein an upper portion and a lower portion of an inner wall of the second casing part are each a concave cylinder segment in the pivoting range of the shaft.

5. The device according to claim 4, wherein the concave cylinder segments are formed by a projection on the upper portion and the lower portion of the inner wall of the second casing part.

6. The device according to claim 4, wherein the concave cylinder segment on the upper portion of the inner wall of the second casing part is formed by two nose-like projections.

7. The device according to claim 4, wherein the concave cylinder segment formed on the lower portion of the inner wall of the second casing part starts at a lower edge of the inner wall which limits the lower portion of the inner wall and ends at a nose-like projection.

8. The device according to claim 4, wherein the concave cylinder segments are formed by a recess in form of a cylinder-like widening of said casing.

9. The device according to claim 1, wherein the first damper door is formed by a first pair of damper door wings, and the second damper door is formed by a second pair of damper door wings.

10. The device according to claim 9 wherein the first pair of damper door wings and the second pair of damper door wings are arranged on the shaft.

11. The device according to claim 1, wherein the shaft extends entirely through said casing.

12. The device according to claim 1, including a third damper door disposed on the shaft, wherein the first and the third damper doors are side damper doors and the second damper door is a central damper door.

13. A device for control of air flow rates into instrument panel air outlets of a vehicle heating and air conditioning unit comprising:
a casing including a first casing part and a second casing part, wherein the first casing part includes a first side air outlet and the second casing part having a second side air outlet, the side air outlets having a lower inner wall and an upper inner wall, wherein the lower inner wall and the upper inner wall of the side air outlets are substantially parallel planar surfaces, and the casing further including a third casing part, wherein the third casing part includes a central air outlet, the central air outlet having a lower inner wall and an upper inner wall, wherein the lower inner wall and the upper inner wall of the central air outlet comprise substantially concave cylinder segments and at least the first outlet and the third outlet are substantially aligned in a common plane;
a shaft disposed in the casing adapted to extend longitudinally axially through the casing parts;
a first damper door disposed in the first side air outlet, the first damper door pivotally supported on the shaft, wherein the first damper door is adapted to sealingly bear against the inner walls of the outlet at a closing position over a pivoting range of a pivoting region of the shaft;
a second damper door disposed in the second side air outlet, the second damper door pivotally supported on the shaft in phase at an angle of substantially 0° relative to the first damper door, wherein the second damper door is adapted to sealingly bear against the inner walls of the outlet at a closing position over the pivoting range of a pivoting region of the shaft;
a third butterfly damper door disposed in the central air outlet, the damper door pivotally supported on the shaft between the first damper door and the second damper door in phase at an angle of substantially 0° relative thereto, wherein the third damper door is adapted to sealingly bear against the inner walls of the outlet at a plurality of closing positions over the pivoting range of a pivoting region of the shaft.

14. The device according to claim 13, wherein the pivoting range of the shaft is established over an angle from 0° to 38°.

15. The device according to claim 13, wherein the concave cylinder segments are formed by at least one projection formed on the lower inner wall and the upper inner wall of the central air outlet.

16. The device according to claim 13, wherein the concave cylinder segment on the upper inner wall of the central air outlet is formed by two nose-like projections.

17. The device according to claim 13, wherein the concave cylinder segment formed on the lower inner wall of the central air outlet starts at a lower edge of the inner wall and ends at a nose-like projection.

18. The device according to claim 13, wherein the concave cylinder segments are formed by a recess in form of a cylinder-like widening of the casing.

19. A device for control of air flow rates into instrument panel air outlets of a vehicle heating and air conditioning unit comprising:
a casing including a first casing part and a second casing part, wherein the first casing part includes a first side air outlet and the second casing part having a second side air outlet, the side air outlets having a lower inner wall and an upper inner wall, and the casing further including a third casing part, wherein the third casing part includes a central air outlet, the central air outlet having a lower inner wall and an upper inner wall;
a shaft disposed in the casing adapted to extend longitudinally axially through the casing parts;
a first damper door disposed in the first side air outlet, the first damper door pivotally supported on the shaft, wherein the first damper door is adapted to sealingly bear against the inner walls of the outlet at a closing position over a defined pivoting range of a pivoting region of the shaft, wherein the defined pivoting range is established over an angle from 0° to 38°;
a second damper door disposed in the second side air outlet, the second damper door pivotally supported on the shaft in phase at an angle of substantially 0° relative to the first damper door, wherein the second damper door is adapted to sealingly bear against the inner walls of the outlet at a closing position over the defined pivoting range of a pivoting region of the shaft;
a third butterfly damper door disposed in the central air outlet, the damper door pivotally supported on the shaft between the first damper door and the second damper door in phase at an angle of substantially 0° relative thereto, wherein the third damper door is adapted to sealingly bear against the inner walls of the outlet at a plurality of closing positions over the defined pivoting range of a pivoting region of the shaft.

20. The device according to claim 19, wherein the first damper door and the second damper door have defined damper door angle positions within the defined pivoting range of the shaft for at least one of a window mode, a floor/window intermediate mode, and a floor mode of a vehicle heating and air conditioning unit.

* * * * *